D. E. SKIRVIN.
SEED CLEANER.
APPLICATION FILED MAY 11, 1914.
1,133,069.
Patented Mar. 23, 1915.
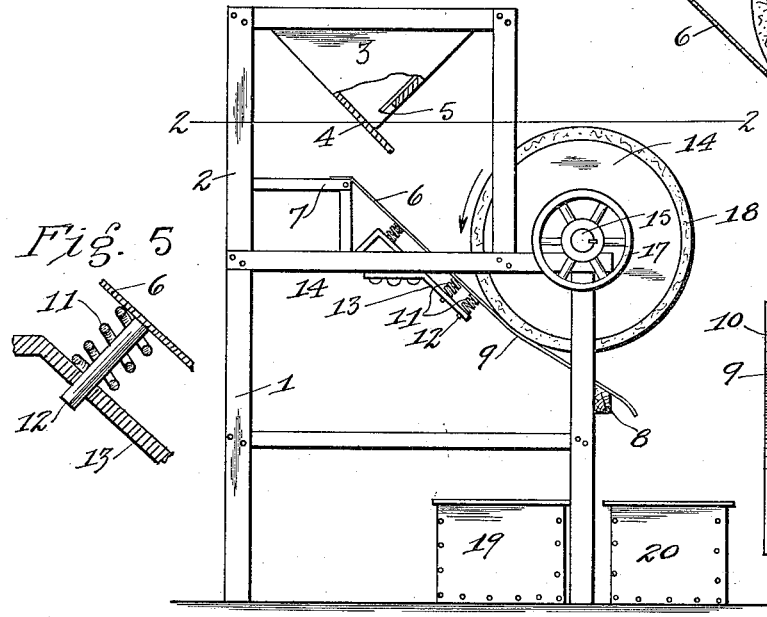
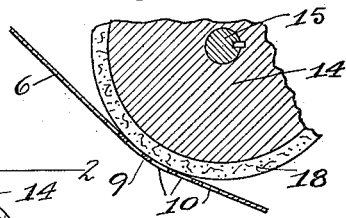
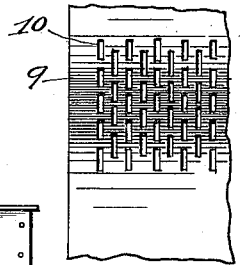
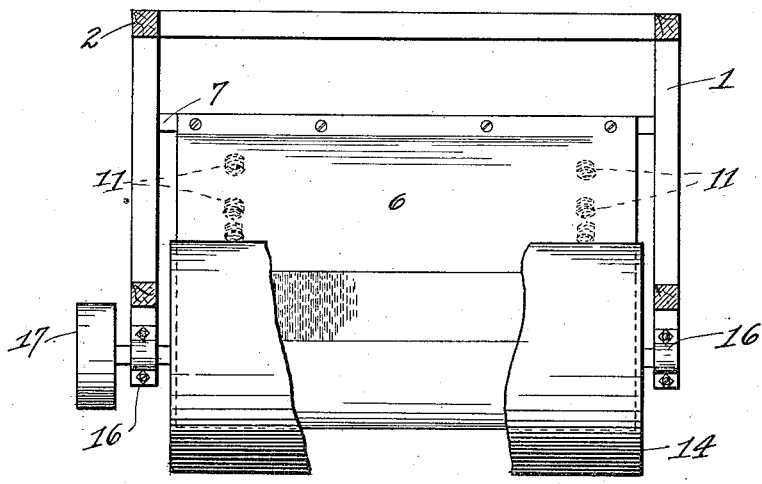
Witnesses
Inventor
D. E. Skirvin
by
Thomas A. Phillips
Attorney

UNITED STATES PATENT OFFICE.

DAVID E. SKIRVIN, OF MOUNT ANGEL, OREGON.

SEED-CLEANER.

1,133,069.  Specification of Letters Patent.  Patented Mar. 23, 1915.

Application filed May 11, 1914.  Serial No. 837,807.

*To all whom it may concern:*

Be it known that I, DAVID E. SKIRVIN, a citizen of the United States of America, residing at Mount Angel, in the county of Marion and State of Oregon, have invented certain new and useful Improvements in Seed-Cleaners, of which the following is a specification.

The present invention relates to seed cleaners, and is designed to provide a simple, economical and efficient device for this purpose.

The invention is especially applicable for use in separating the seeds of plantain, buckthorn, and other weeds from clover seed, and inasmuch as the weed seeds and clover seeds are of differing sizes and shape, I adapt the machine which embodies my invention, for the purpose of eliminating the cleaned or desirable seeds from the seeds of the weeds of other plants as the case may be.

With these objects in view the invention comprises certain novel combinations and arrangements of a stationary screen, and a revoluble member by means of which the desirable seeds are separated, and the remaining or weed seeds are permitted to pass from the machine and be disposed of at will.

In the accompanying drawings I have illustrated one complete example of the physical embodiment of my invention constructed according to the best mode I have so far devised for the practical application of the principles of the invention.

Figure 1 is a side elevation of a seed separating machine embodying the novel features of my invention. Fig. 2 is a plan view partly in section on line 2—2 of Fig. 1, showing the drum or roll partly broken away for convenience of illustration. Fig. 3 is an enlarged fragmentary sectional view of the co-acting members of the cleaner. Fig. 4 is a plan view showing a portion of the screen. Fig. 5 is a detail sectional view showing the means for resiliently supporting the stationary cleaning member.

In the preferred embodiment of my invention as illustrated in the drawings, I employ a machine supported upon the main frame 1, and employ in connection therewith an upper frame or superstructure 2, and in the latter, a seed hopper 3 is supported. This seed hopper is designed to receive the grains or seeds which, as before stated, are a mixture of plantain, buckthorn and other weed seeds with the clover seed. The hopper is provided at its lower end with a mouth or exit opening 4 which may be controlled and regulated by an adjustable gate 5. Below the hopper a metallic plate 6 is located, and this plate is suspended from the supplemental frame 7 at its upper end, and at its lower end is supported by a cross bar 8. The plate, as shown in Fig. 1, is arranged at a suitable inclination or angle from the vertical, and one portion of this plate as 9 is curved or downwardly bent, and provided with a multiplicity of perforations 10 which extend in the direction of inclination of the plate, and cover the area of the plate from side to side at the curved portion 9. The material of the plate may be elastic and it may be resiliently supported, but to insure a resiliency and allow a slight movement of the plate 6, I employ spring cushions. These spring cushions comprise coil springs as 11, which are wound about a post 12 which projects from the under side of the plate, and extends through a perforated bracket 13, fastened at 14 to the frame 1. There are six of these spring cushions indicated in Fig. 2, but it will be understood that the number may be varied to suit the purpose. In connection with this resiliently supported perforated plate I employ a revoluble member, such as a cylinder or drum 14 whose shaft 15 is journaled in bearings 16—16 in the frame 1, and a pulley 17 is illustrated by means of which the drum may be revolved. It will be understood, of course, that manual power may be employed if desired to revolve the drum, and the pulley 17 which is illustrated as typical driving means may be dispensed with if desired. The entire periphery of the drum 14 is covered with a layer of cloth or felt 18 which posesses the characteristic of elasticity, and has the consistency of a cushion. The drum is located just above the plate 6, and the curved portion 9 of the plate conforms to the outline or perforation of the drum, so that the drum as it is revolved moves in light frictional contact with the curved part of the plate.

In operation, when the mixed seed are fed from the hopper 3 they fall upon the blank or plane face of the plate 6, and slide down between the curved portion 9 of the plate and the revolving drum 14. As the seeds are passed through between the plate and drum, the clover seeds which are round and smaller than the plantain or buckthorn, are pushed through the perforations 10 by contact from the drum, and the clover seeds fall into a waiting receptacle 19. The larger and more irregularly formed seeds such as plantain and buckthorn seeds are passed between the plate and drum, and finally fall into the waiting receptacle 20 and may be disposed of as desired. In this manner the clover seeds are separated from the other seeds, and comparatively little waste of the clover seeds is encountered.

From the above description taken in connection with my drawings it is evident that I have produced a machine which is capable of performing the functions set forth as the purpose and object of my invention.

Having thus fully described my invention, what I claim as new and desire to secure by Letters Patent, is:—

The combination in a seed separating machine with its frame and hopper, of an inclined screen member, a rotary drum operatively coacting with said screen, a flexible covering on the drum lightly contacting with said screen, and springs supported from the frame bearing on the screen member and holding it in light frictional contact with the cover on the drum.

In testimony whereof I affix my signature in presence of two witnesses.

DAVID E. SKIRVIN.

Witnesses:
Jos. J. Keber,
Anna Keber.

Copies of this patent may be obtained for five cents each, by addressing the "Commissioner of Patents, Washington, D. C."